United States Patent
Stalder et al.

(10) Patent No.: US 10,158,120 B2
(45) Date of Patent: Dec. 18, 2018

(54) AMORPHOUS METAL CURRENT COLLECTOR

(71) Applicant: The Swatch Group Research and Development Ltd, Marin (CH)

(72) Inventors: Michael Stalder, Bienne (CH); Yves Winkler, Schmitten (CH); Agnes Marlot Doerr, Neuchatel (CH)

(73) Assignee: The Swatch Group Research and Development Ltd, Marin (CH)

(*) Notice: Subject to any disclaimer, the term of this patent is extended or adjusted under 35 U.S.C. 154(b) by 271 days.

(21) Appl. No.: 14/366,050

(22) PCT Filed: Dec. 20, 2012

(86) PCT No.: PCT/EP2012/076499
§ 371 (c)(1),
(2) Date: Jun. 17, 2014

(87) PCT Pub. No.: WO2013/092921
PCT Pub. Date: Jun. 27, 2013

(65) Prior Publication Data
US 2014/0363743 A1    Dec. 11, 2014

(30) Foreign Application Priority Data
Dec. 21, 2011  (EP) .................................... 11194993

(51) Int. Cl.
*H01M 4/66* (2006.01)
*C22C 45/00* (2006.01)
(Continued)

(52) U.S. Cl.
CPC ............. *H01M 4/662* (2013.01); *C22C 45/00* (2013.01); *C22C 45/001* (2013.01); *C22C 45/10* (2013.01);
(Continued)

(58) Field of Classification Search
CPC ........ H01M 4/662; H01M 4/70; H01M 4/661; H01M 4/64; H01M 4/66; H01M 10/02; H01M 10/0436; C22C 45/10; C22C 45/00
See application file for complete search history.

(56) References Cited

U.S. PATENT DOCUMENTS 4,521,498 A * 6/1985 Juergens ............. H01M 10/342
429/160
2006/0154084 A1   7/2006 Schuh et al.
(Continued)

FOREIGN PATENT DOCUMENTS

DE    31 335 99 A1   3/1983
JP    60-101870 A    6/1985
(Continued)

OTHER PUBLICATIONS

English Translation of JP2001-250559.*
(Continued)

*Primary Examiner* — Jimmy Vo
(74) *Attorney, Agent, or Firm* — Sughrue Mion, PLLC (57) ABSTRACT

The present invention concerns an electrochemical device comprising a cathode and an anode separated from each other by a separator, the battery further comprising two current collectors so that the anode and cathode are each arranged between the separator and a current collector, characterized in that at least one of the two current collectors is made of an at least partially amorphous material comprising at least one metallic element.

17 Claims, 5 Drawing Sheets

(51) Int. Cl.
*H01M 4/70* (2006.01)
*H01M 10/04* (2006.01)
*C22C 45/10* (2006.01)
*H01M 10/02* (2006.01)

(52) U.S. Cl.
CPC ............ *H01M 4/661* (2013.01); *H01M 4/70* (2013.01); *H01M 10/02* (2013.01); *H01M 10/0436* (2013.01); *H01M 2220/30* (2013.01)

(56) References Cited

U.S. PATENT DOCUMENTS

| | | | |
|---|---|---|---|
| 2007/0003812 A1* | 1/2007 | Wende | B22D 27/04 429/434 |
| 2007/0111099 A1 | 5/2007 | Nanjundaswamy et al. | |
| 2010/0133348 A1* | 6/2010 | Peat | H01G 9/155 235/492 |

FOREIGN PATENT DOCUMENTS

| | | | | |
|---|---|---|---|---|
| JP | 2001-250559 | * | 3/2000 | ............ H01M 10/05 |
| JP | 2001-250559 A | | 9/2001 | |
| JP | 2002-015721 | * | 1/2002 | ............ H01M 10/05 |
| JP | 2005-171333 | * | 12/2003 | ............ C22C 45/10 |
| JP | 2004-232070 A | | 8/2004 | |
| JP | 2005-171333 A | | 6/2005 | |
| JP | 2006-253089 A | | 9/2006 | |
| WO | WO2010138177 | * | 12/2010 | ............ H01M 2/16 |

OTHER PUBLICATIONS

English Translation of JP2005-171333.*
English Translation of JP2002-015721.*
G. Fritsch et al., "Pressure dependence of the electrical resistivity of some metallic glasses", J. Phys. F. Met. Phys., 1982, pp. 2965-2974, vol. 12, No. 12.
International Search Report for PCT/EP2012/076499 dated Apr. 9, 2013.

* cited by examiner

AMORPHOUS METAL CURRENT COLLECTOR

CROSS REFERENCE TO RELATED APPLICATIONS

This is a National Phase Application in the United States of International Patent Application PCT/EP 2012/076499 filed Dec. 20, 2012 which claims priority on EP 11194993.9 filed Dec. 21, 2011. The entire disclosures of the above patent applications are hereby incorporated by reference.

The present invention concerns an electrochemical device comprising a cathode and an anode separated from each other by a separator, the electrochemical device further including two current collectors so that the anode and the cathode are each arranged between the separator and a current collector. This device may be a battery or cell.

BACKGROUND OF THE INVENTION

Among the multitude of existing batteries and cells, batteries called thin film batteries are known. These batteries, shown in FIG. 1, comprise a cathode and anode separated from each other by a separator. The battery further comprises two current collectors which transport the electrons between the cathode and anode and the electric circuit outside the battery.

One of the applications of these batteries, or electrochemical devices, is to obtain flexible batteries. To achieve this, the current collectors and separator must be flexible. One of the elements which greatly limits the flexibility of thin film batteries is the current collector. The current collector is the element of the battery which must have the best electrical conductivity, since the distance travelled by the electric current is by far the greatest (along the entire dimensions of the battery, whereas in the other elements the current only travels the shortest dimension, i.e. the thickness). Too high resistance in the current collector leads to a battery voltage drop and to energy dissipating in the form of heat. For this reason, metals are generally used for the current collector since they have the best electrical conductivity among ambient temperature materials. When the current collectors take the form of metal sheets and are placed outside the battery, as in FIG. 1, they also act as barrier layers preventing the evaporation of the electrolyte and the entry of gases which are noxious for the battery (depending upon the type of battery, e.g. $CO_2$, $O_2$, $H_2$).

However, very flexible materials, such as polymers or composites, can be used for the other battery elements. The use of a metal sheet as the current collector has a negative effect on the flexibility of the battery. Moreover, since the current collector is generally found at the ends of the battery, it is therefore the element that undergoes the highest curvature stress, i.e. a traction stress at the highest radius of curvature on the outside, and compression stress at the smallest radius of curvature on the inside. Consequently, cracks appear in the current collectors after around a hundred bends at radii of curvature of less than 1.5 cm. These cracks become more marked with an increasing number of bends and form folds which damage the active layers inside the battery. This results in a decrease in capacitance which becomes increasingly marked and eventually destroys the battery.

Furthermore, it is known from the prior art the documents U.S. 2007/003812 and JP 2001 250559 disclosing, respectively, a fuel cell comprising the current collectors made in an amorphous metal and a battery comprising a cathode and an anode separated between them by a separator, said battery further comprising two current collectors, the current collector of the cathode being made in a metal or amorphous alloy.

SUMMARY OF THE INVENTION

The invention concerns an electrochemical device such as a battery which overcomes the aforementioned drawbacks of the prior art by proposing a flexible battery which withstands more bending stress and is more reliable.

The invention therefore concerns a cell including a cathode and an anode separated from each other by a separator. The battery further includes an electrolyte and two current collectors so that the anode and cathode are each arranged between the separator and a current collector. The battery is characterized in that the two current collectors are made of at least partially amorphous metallic material.

Advantageous embodiments of this cell form the subject of the dependent claims.

In a first advantageous embodiment, of the two collectors are made of totally amorphous material.

In a second advantageous embodiment, said material includes at least one of the elements found in the list comprising Ti, Zr, Ni, Cu, Fe, Cr, Mn, V, W, Al.

In a third advantageous embodiment, said material has a maximum resistivity of $10^{-5}$ Ohm*m.

In another advantageous embodiment, said material has a maximum resistivity of $10^{-6}$ Ohm*m.

In another advantageous embodiment, said material includes 47.5% weight percent of copper, 47.5% weight percent of zirconium and 5% weight percent of aluminium.

In another advantageous embodiment, the thickness of the current collectors is between 1 μm and 50 μm.

In another advantageous embodiment, the thickness of the current collectors is between 5 μm and 25 μm.

In another advantageous embodiment, the thickness of the current collectors is unequal.

In another advantageous embodiment, the edges of the current collectors are thicker than the central area of said collectors.

In another advantageous embodiment, at least one of the two current collectors has structures on the bottom surface thereof.

In another advantageous embodiment, said at least partially amorphous material comprising at least one metallic element further includes a crystalline element.

In another advantageous embodiment, at least one of the two current collectors is made by melt-spinning.

In another advantageous embodiment, at least one of the two current collectors is made by electrolysis.

In another advantageous embodiment, said device is a cell or battery.

In another advantageous embodiment, the cell or battery is rechargeable.

One advantage of the battery of the present invention is that it has more advantageous elastic characteristics. In fact, in the case of an amorphous material, the ratio $\sigma_e/E$ is increased by raising the limit of elasticity $\sigma e$ (E being the Young's modulus). Thus, the stress beyond which the material does not return to its initial shape increases. This improvement in the ratio $\sigma_e/E$ thus allows greater deformation. This then enables the battery to undergo greater bending stresses and at a higher frequency.

BRIEF DESCRIPTION OF THE DRAWINGS

The objects, advantages and features of the electrochemical device according to the present invention will appear more clearly in the following detailed description of at least one embodiment of the invention, given solely by way of non-limiting example and illustrated by the annexed drawings, in which.

DETAILED DESCRIPTION OF THE INVENTION

Figure 1:
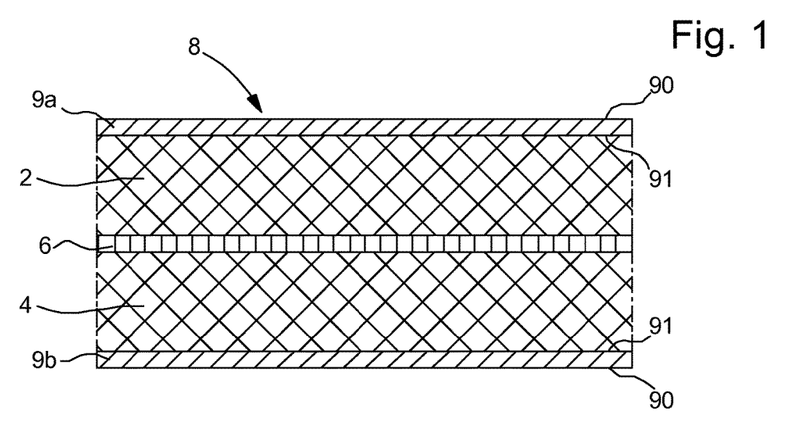
FIGS. 1 to 3 show schematic cross-sections of the principle of a battery.
Figure 2:
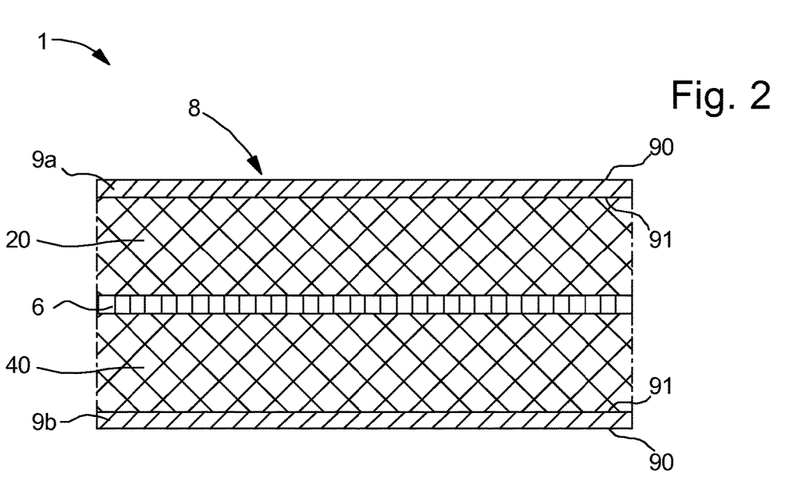
Figure 3:
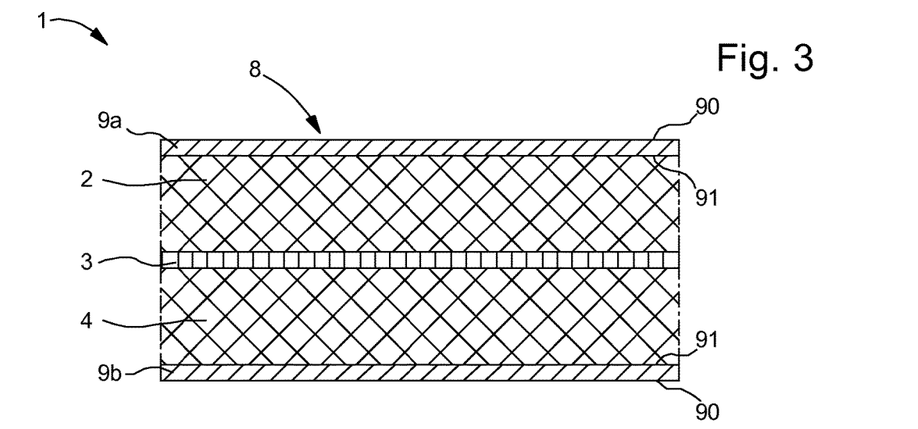

FIG. 1 shows an electrochemical device 1 according to the invention. This electrochemical device 1 includes a cathode 2 and an anode 4 separated from each other by a separator 6. The battery further includes two current collectors 8 so that the anode 4 and cathode 2 are each arranged between the separator 6 and a current collector 8. There is thus an anode current collector 9b and a cathode current collector 9a. Each current collector has a bottom surface 91 and a top surface 90. Separator 6 is generally made of polymers or composite materials. Electrochemical device 1 further includes an electrolyte for exchanging ions between cathode 2 and anode 4. This electrolyte may, as in FIG. 1, be directly integrated in separator 6, the latter being a porous separator 6 whose pores are filled with liquid or gel electrolyte. When anode 20 and cathode 40 are porous as seen in FIG. 2, the electrolyte also fills these pores. It is also possible for the electrolyte to be formed of an entirely solid layer 3, which then replaces the separator as seen in FIG. 3.

This electrochemical device 1 can be used for various applications such as, for example, a horological application or a smart card or telecommunications application. This electrochemical device 1 may be a battery or cell, and the battery or cell may or may not be rechargeable. The terms "electrochemical device", "battery" or "cell" may be used to designate the present invention.

If it is desired to make electrochemical device 1 in a flexible film while preventing the appearance of cracks in current collector 8, even after a large number of bends, it is necessary to remain within the elastic deformation range of the material and also for the material to have good fatigue resistance in the area subject to stress. Generally, for a given alloy, the number of cycles prior to a fatigue break greatly increases when the level of stress moves away from the limit of elasticity. Below a certain stress, fatigue breakage disappears. This behaviour is generally represented by the Wöhler curve.

The present invention consists in using amorphous metal current collectors 8. The elastic deformation of amorphous metals (or metallic glass), which are generally alloys rather than pure metals, is around 2 to 4 times higher than crystalline metals.

Advantageously, at least one a preferably the two current collectors 8 are made of an at least partially amorphous metal. "At least partially amorphous material" means that, for the thicknesses required for the intended application, the material is able to at least partially solidify in the amorphous phase.

For the applications for which the electrochemical film devices of the present invention are used, the total thickness of electrochemical device 1 is generally 0.4 mm. The thickness of current collectors 8 of this electrochemical device 1 may vary from 1 to 50 µm. Preferably, the thickness is comprised between 5 and 25 µm.

Indeed, the advantage of these amorphous metal alloys arises from the fact that, during manufacture, the atoms forming the amorphous materials are not arranged in a particular structure as is the case for crystalline materials. Thus, even if the Young's modulus E of a crystalline metal and that of an amorphous metal are close, the limit of elasticity $\sigma_e$ is different. An amorphous metal differs therefore in that it has a higher limit of elasticity $\sigma_{eA}$ than that $\sigma e_c$ of the crystalline metal by a factor of between two and four. This means that amorphous metals can undergo higher stress before reaching the limit of elasticity σe.

Moreover, given that the minimum radius of curvature is inversely proportional to the maximum admissible deformation, this means that a radius of curvature which is at least two times smaller is possible by using an amorphous metal, instead of a crystalline metal as is the case in the prior art. Moreover, for an identical radius of curvature to that of a crystalline metal, the risk of fatigue breakage decreases since the limit of elasticity of an amorphous metal is generally 2-4 times higher than that of a crystalline metal of similar chemical composition. Indeed, the relative cyclical stress will be significantly lower for the amorphous metal and thus the number of cycles prior to breakage will increase considerably.

Surprisingly, the flexibility of cells assembled with amorphous metal current collectors according to the invention is more than 10 times higher than for cells using a crystalline metal. This is due to the fact that the inside of the battery is protected by the collectors. Indeed, in the case of crystalline metal, folds are formed in case of bending of the cell and therefore of the collectors. The folds are locally very high curvatures (for cells typically bent with a radius of 1 cm, the folds have a radius less than 1 mm). As the amorphous metal does not form folds during its flexion, local deformations are avoided (delamination and destruction of active layers). Consequently, the interior of the cell is protected from folds having very small radius of curvature. This in turn allows improved flexibility. Typically, at least 1500 bendings with a radius of 1 cm are possible using two current collectors completely in amorphous metal with a thickness of 25 micrometer in a cell with a total thickness of 0.4 mm, without damaging the latter. Among the film batteries available on the market today, none cell survive 150 flections with a radius of 1 cm. The improvement in the flexibility of cell current collectors made from amorphous metal is much greater than the increase by a factor of 2-4 that a man skilled in the art bright possibly predict by analysing the mechanical properties of amorphous metals.

To be able to be used for current collector 8, a material must be stable inside the electrochemical potential window of the electrode, which is between the charged and discharged state of the electrode potential, so as to prevent any corrosion of the current collector. Likewise, the material of current collector 8 must not react chemically with the substances forming the electrodes and electrolyte 3. The stability of current collector 8 may be thermodynamic, kinetic or achieved by passivation. The electrical resistivity of current collector 8 must not be too high so that it does not affect the power and efficiency of electrochemical device 1. Typically, the resistivity of the alloy used as collector 8 should not exceed $10^{-5}$ Ohm*m, but more preferably $10^{-6}$ Ohm*m.

Consequently, the amorphous alloys formed of the following chemical elements are of particular interest for this application: Ti, Zr, Ni, Cu, Fe, Cr, Mn, V, W, Al. An example of an amorphous alloy that can be used for this application is $Cu_{47.5}Zr_{47.5}Al_5$. The good electrical conductivity of this alloy combined with its high mechanical properties ($\delta_e$~1600 MPa; E~87 GPa; $\varepsilon_e$~2%) makes it a particularly advantageous candidate. It is also possible to envisage using composites with an amorphous metal matrix and a second very conductive phase (pure copper for example) to further increase electrical conductivity.

The melt-spinning method is used to make current collectors 8. This method, seen in FIG. 8, consists in principle in taking a tank of warm liquid 18 (molten metal for example) heated by a heating system 14, which may be a pressure system, from which there flows a thread which, when it falls, enters into contact with a good heat conducting metal cylinder 16 (made of copper for example). The melt spinning wheel rotates at high speed and is then cooled, generally by contact with another cold liquid, liquid nitrogen or water, which allows it to stay cold. Pressurising the tank allows the liquid to be ejected. The liquid is cooled on contact with the wheel and can form a solid strip which may be thick or thin. The thickness is adjusted by working on the flow rate of the liquid metal or on the rotational speed of the good heat conducting metal cylinder.

Another method for making current collectors 8 is electrolytis is deposition. This method is based on the principle of the depositing a metal or metal alloy via a current on an electrically conductive support.

In this method, two electrodes are immersed in a bath containing the metal cations to be deposited. Application of a current or potential difference between the two electrodes causes the desired metal cations to be deposited on the cathode acting as a support. After manufacture, the metal or alloy formed can be insulated from the cathode by physical or chemical means.

To adjust the thickness of current collector 8, the duration of electrolysis is adjusted so that the longer the duration, the greater the quantity of material deposited.

If the material deposited is an alloy, several metal cations are contained in the bath. The composition of the alloy which will form current collector 8 can be modulated by adjusting the parameters of the current, temperature and composition of the bath. The ductile properties of the material can be improved or modified by the use of pulsed currents.

When this process is applied in an aqueous medium at low temperatures compared to metallurgic or physical manufacturing methods, the process results in the formation of metals in the amorphous state.

Figure 4:
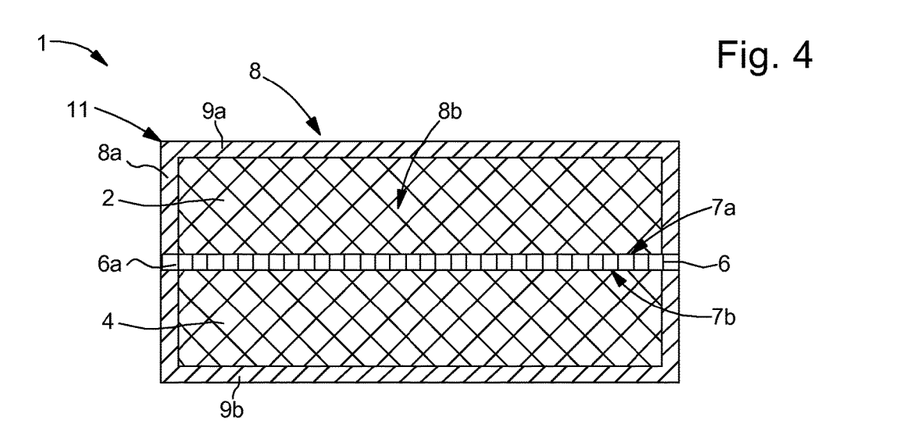
FIG. 4 shows a schematic cross-section of a first variant of the battery according to the present invention.

In a first construction variant of electrochemical device 1 according to the present invention and visible in FIG. 4, electrochemical device 1 is closed by current collectors 8. This means that current collectors 8 form a structure 11. To achieve this, each current collector 8 takes the form of a smooth plate, for example a rectangular plate, with a peripheral edge 8a. This peripheral edge 8a thus defines a housing 8b in which the anode 2 or cathode 4 material is placed. These two collectors 8 are thus separated by separator 6. This separator 6 includes a first surface 7a and a second surface 7b. The elements are assembled so that the peripheral edge 8a of anode collector 9b is welded to the first surface 7a of separator 6 and the peripheral edge 8a of cathode collector 9a is welded to second surface 7b of separator as seen in FIG. 4. The welds are preferably at the ends 6a of separator 6.

Figure 5:
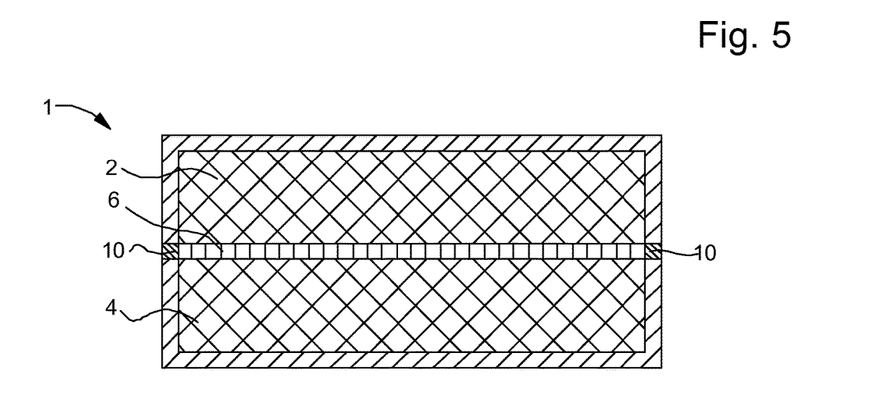
FIG. 5 is a schematic cross-section of an alternative to the first variant of the battery according to the present invention.

In an alternative, seen in FIG. 5, to this first variant, separator 6 makes it impossible for current collectors 8 to be welded. Battery 1 therefore includes a joint 10 which is secured to the separator and to which the peripheral edge 8a of anode collector 9b and peripheral edge 8a of cathode collector 9a are welded.

Figure 6:
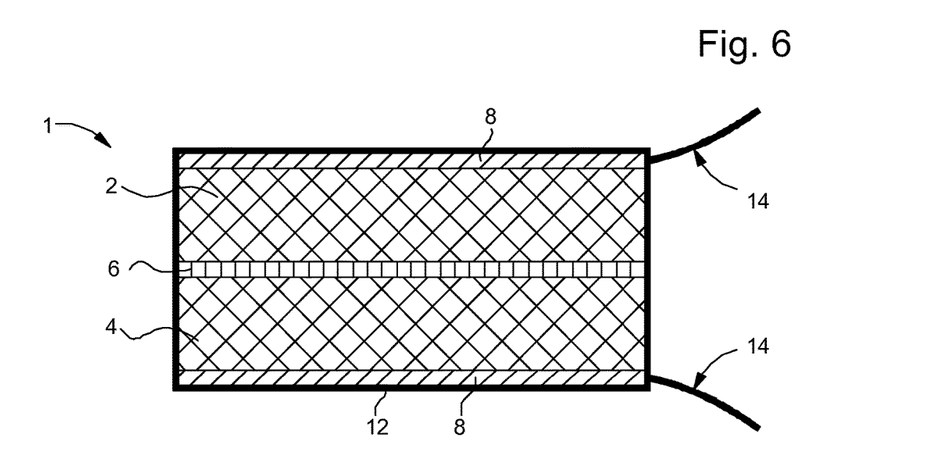
FIG. 6 shows a schematic cross-section of a second variant of the battery according to the present invention.

In a second variant seen in FIG. 6, current collectors 8 are simply a smooth sheet made of amorphous metal. Anode material 4 is arranged between separator 6 and anode collector 9b whereas cathode material 2 is arranged between separator 6 and cathode collector 9a. Shrewdly, this variant encloses the electrochemical device 1 thus arranged with a resin layer 12 or in a laminated polyethylene/aluminium/polyethylene sachet which is vacuum packed. Conductive tongues 14 are then pre-fixed to collectors 8 to form the battery contacts.

Figure 7:
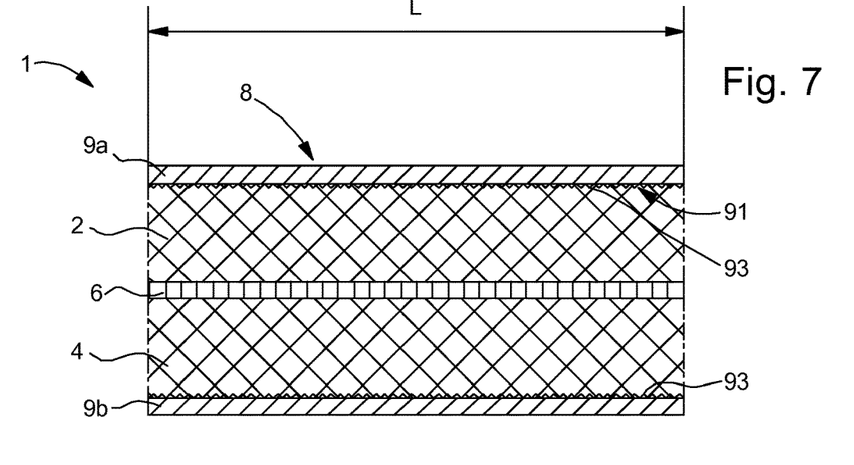
FIG. 7 shows a schematic cross-section of a third variant of the battery according to the present invention.

In a third variant seen in FIG. 7, the bottom surface 91 of collectors 8 could be structured. In fact, since electrochemical device 1 is capable of being bent, shearing forces may appear between current collector 8 and the electrolyte forming cathode 2 or anode 4. If these shearing stresses are too high, battery 1 is liable to delaminate.

Structuring the bottom surface 91 of each current collector 8 increases the friction forces between current collector 8 and the electrolyte forming cathode 2 or anode 4. Consequently, during twisting, the additional force of adhesion provided by the structures pushes back the limit of delamination.

For this adhesion to be efficient, the structures 93 must be arranged so that adhesion is improved. Take the example of an electrochemical device 1 in the form of a rectangular film. In the case of bending along an axis parallel to the width of electrochemical device 1, the structures must be arranged in the same direction, i.e. parallel to the width of battery 1. Conversely, in the case of bending along an axis parallel to the length of electrochemical device 1, structures 93 must be arranged in the same direction, i.e. parallel to the length of electrochemical device 1.

Nonetheless, the bottom surfaces 91 of each current collector 8 could be structured lengthways and widthways. This arrangement allows battery 1 to bend lengthways or widthways.

Figure 8:
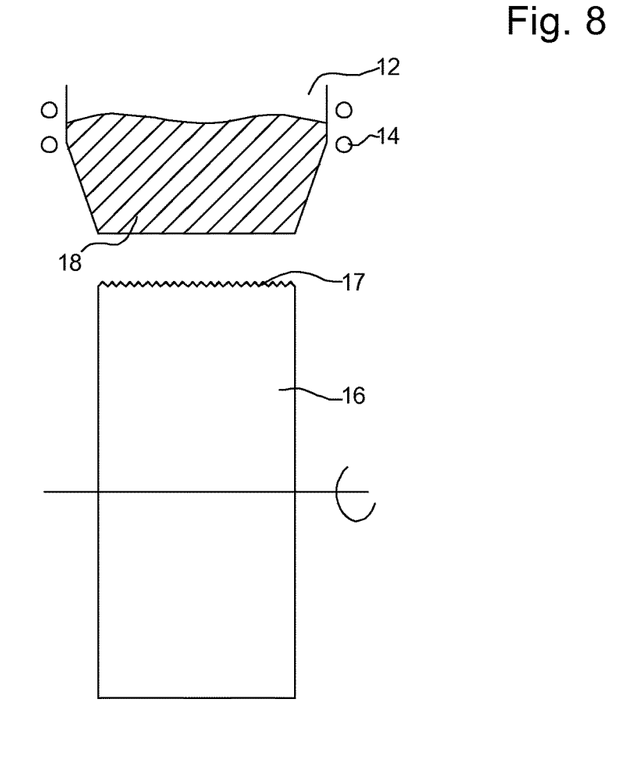
FIG. 8 is a schematic diagram of a method for manufacturing a current collector of the battery according to the present invention.

It is possible to use various methods to make these structures 93. A first solution consists in making the structures immediately during manufacture of current collector 8, i.e. during the melt spinning step as seen in FIG. 8. To achieve this, the cylinder to which the molten metal is sent to form the strip is structured immediately. It is clear that cylinder 16 has at the surface thereof the negative die 17 of structures 93 which have to be formed on current collector 8. Consequently, during this melt spinning step, the liquid metal is straight away solidified in amorphous form with the negative shape of cylinder 16.

Another solution consists in using the hot working principle. This method consists in placing current collector 8 between two dies, heating it within a temperature range between the vitreous transition temperature Tg and the crystallisation temperature Tx while pressing it for a determined time to preserve a totally or partially amorphous structure. This is carried out for the purpose of keeping the characteristic elastic properties of amorphous metals. Once the pressing has finished, current collector 8 is cooled rapidly to maintain the amorphous state. This shaping method can very precisely reproduce fine geometries since, between Tg and Tx, the viscosity of the alloy greatly decreases, as the alloy therefore matches all the details of the dies without losing its amorphous state.

To form these structures 93 it is also possible to form current collector 8 immediately during manufacture by electrolysis, by selecting a cathode support which is structured. One of the aspects of current deposition is that this method can replicate various surface aspects with a high level of precision, including complex aspects like those described for the requirements of this invention.

In a fourth variant, it is possible to envisage pre-bending thin film battery 1. This means that thin film electrochemical device 1 is naturally curved. Indeed, it is possible for electrochemical device 1 to be placed in a non-linear place such as a watch bracelet or for the battery to be folded for integration into the apparatus or object for which it is intended. It is thus advantageous for electrochemical device 1 naturally to have a non-linear shape to make it simpler to integrate. This also means that thin film electrochemical device 1 does not have to be elastically or plastically deformed and consequently made more brittle.

The hot working technique is used to make this type of electrochemical device 1. Each current collector 8 is placed between two dies and then heated to a temperature comprised between the vitreous temperature Tg and crystallisation temperature Tx. The viscosity of the amorphous metal thus increases without any loss of its amorphous characteristic. Current collector 8 is then pressed by the two dies, which have a curved profile so that one of the dies has a convex profile and one of the dies has a concave profile. The rapid cooling step preserves the amorphous state and solidifies current collector 8. Of course, the profile of the dies is calculated to obtain the desired curvature.

For the same purpose, the pre-bent current collector 8 can be formed immediately during manufacture by electrolysis by using a cathode-support which has the desired element of curvature.

Figure 9:
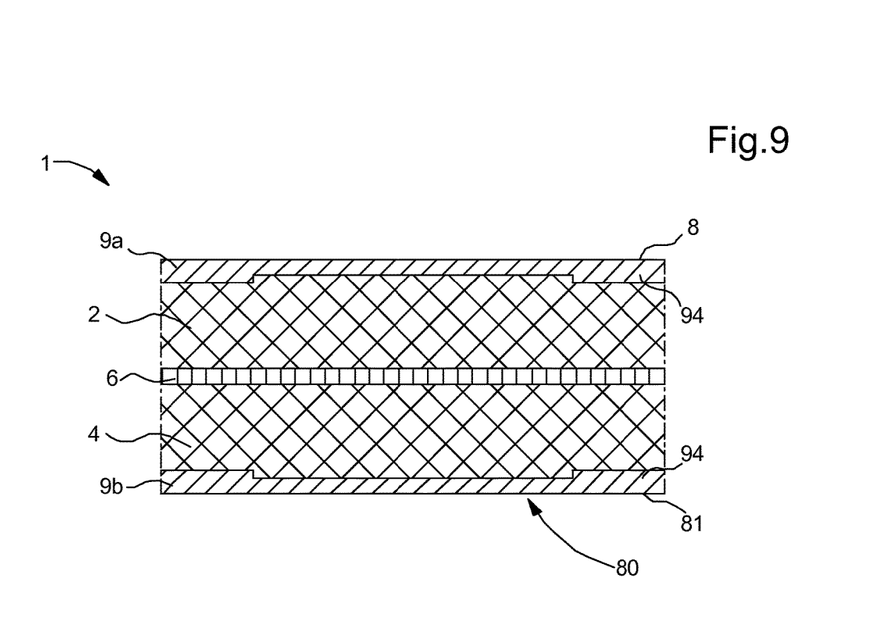
FIG. 9 shows a schematic cross-section of a fifth variant of the battery according to the present invention.

In a fifth variant seen in FIG. 9, current collectors 8 could exhibit non-uniform deformation. To achieve this, each collector 8 has a variable or unequal thickness 94. Indeed, for a defined stress, the deformation of current collector 8 will be different according to the thickness thereof. It is thus clear that a current collector 8 of defined thickness will deform more than a current collector 8 which two times thicker. Having a current collector 8 of variable thickness 94 means that said current collector 8 can be configured so that the deformation of areas where the thickness is greater is less than the deformation of areas where the thickness is smaller. In particular, it is advantageous for the peripheral areas 81 of current collector 8 to be thicker than central area 80. Indeed, central area 80 is generally the area that has to undergo the greatest deformation. This central area 80 must consequently be able to be deformed easily so as not to deform too quickly plastically. Conversely, the edges 81 of current collector 8 are subject to little stress and deformation. It is therefore possible for the thickness of the edges to be different and in particular thicker.

It will be clear that various alterations and/or improvements and/or combinations evident to those skilled in the art may be made to the various embodiments of the invention set out above without departing from the scope of the invention defined by the annexed claims.

In the first construction variant collectors 8 may therefore be secured by hot forming.

The invention claimed is:

1. A cell comprising a cathode and an anode separated from each other by a separator, said cell further including an electrolyte and two current collectors so that the anode and the cathode are each arranged between the separator and a current collector, wherein the two current collectors are made of an at least partially amorphous material including at least one metallic element,
   wherein a peripheral edge of one of the current collectors is in direct contact with or welded to the separator.

2. The cell according to claim 1, wherein the two collectors are made of a totally amorphous material.

3. The cell according to claim 1, wherein said material includes at least one of the elements found in the list comprising Ti, Zr, Ni, Cu, Fe, Cr, Mn, V, W, and Al.

4. The cell according to claim 1, wherein said material has a maximum resistivity of $10^{-5}$ Ohm*m.

5. The cell according to claim 1, wherein said material has a maximum resistivity of $10^{-6}$ Ohm*m.

6. The cell according to claim 1, wherein said material includes 47.5% weight percent copper, 47.5% weight percent zirconium and 5% weight percent aluminium.

7. The cell according to claim 1, wherein the thickness of the current collectors is comprised between 1 μm and 50 μm.

8. The cell according to claim 1, wherein the thickness of the current collectors is comprised between 5 μm and 25 μm.

9. The cell according to claim 1, wherein the thickness of the current collectors is unequal.

10. The cell according to claim 9, wherein the edges of the current collectors are thicker than the central area of said collectors.

11. The cell according to claim 1, wherein at least one of the two current collectors has structures on the bottom surface thereof.

12. The cell according to claim 1, wherein said at least partially amorphous material comprising at least one metallic element further includes a crystalline element.

13. The cell according to claim 1, wherein at least one of the current collectors is made by melt-spinning.

14. The cell according to claim 1, wherein at least one of the two collectors is made by electrolysis.

15. The cell according to claim 1, wherein the cell or battery is rechargeable.

16. The cell according to claim 1, wherein a total thickness of the cell is 0.4 mm.

17. The cell according to claim 1, wherein the peripheral edge of one of the current collectors is welded to the separator or to a peripheral edge of the other current collector.

* * * * *